United States Patent Office 3,470,702
Patented Oct. 7, 1969

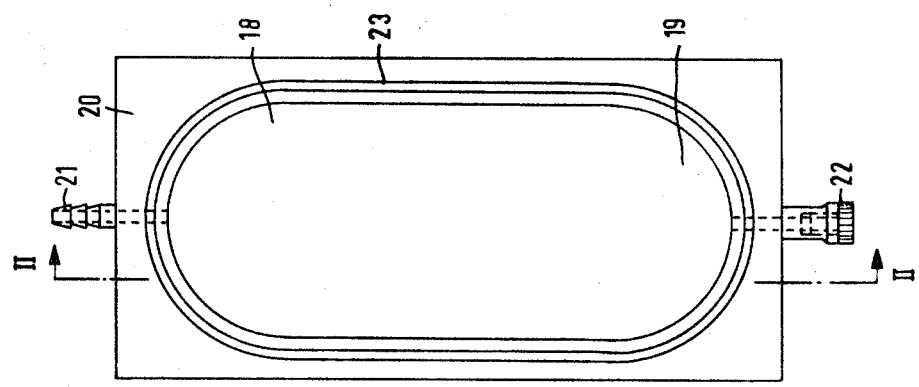
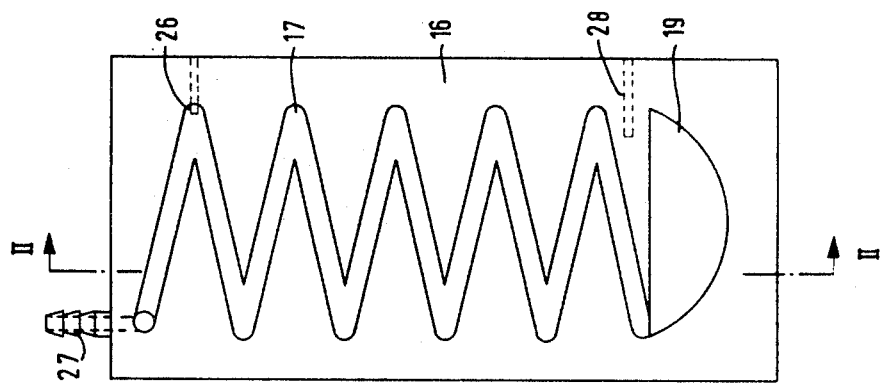
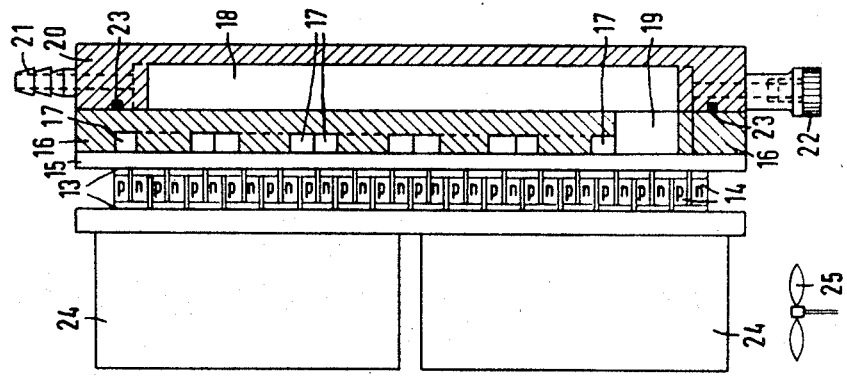

3,470,702
APPARATUS FOR REGULATING HUMIDITY IN A CLIMATIC CHAMBER AND METHOD OF OPERATING THE SAME
Werner Koch, Grafrath, and Hermann Roth and Heinz Walz, Erlangen, Germany, assignors to Siemens Aktiengesellschaft, a corporation of Germany
Filed Sept. 14, 1967, Ser. No. 667,754
Claims priority, application Germany, Sept. 15, 1966, S 105,886
Int. Cl. F25b 21/02
U.S. Cl. 62—3        16 Claims

ABSTRACT OF THE DISCLOSURE

Apparatus for regulating the moisture or humidity in a climatic chamber wherein the temperature is varied by means of Peltier blocks includes a by-pass duct system connected to the climatic chamber, the system including a Peltier-cooled humidity separator and a pump. The humidity separator is constructed of a Peltier block thermally conductively and electrically insulatingly connected at the warm side thereof with aeratable cooling fins and on the cold side thereof with a heat exchanger in the form of a flow-through cooler. The method of operating the apparatus includes conducting gas from the climatic chamber through the by-pass so that the gas in the humidity separator connected in the by-pass line has a dew point that is 0.5 to 15° C. lower than the dew point of the gas in the climatic chamber.

---

Our invention relates to apparatus for regulating the moisture or humidity in a climatic chamber wherein the temperature is variable by means of Peltier blocks, and to method of operating the apparatus.

The climatizing of spaces is required for exact biological or zoological experiments, such as for example for experiments concerning the exchange of gaseous materials. For this purpose, either a local climate must be reproduced or the most varied physical conditions must be able to be simulated within a space or chamber. It is of primary importance that the temperature of the space or chamber be held exactly constant or that it be able to be controllably varied effectively. It is of equal importance that the moisture or humidity in the experimental climatic chamber be capable of being varied.

It has been known heretofore to regulate the temperature in a climatic chamber by means of water cooling with compressor systems or by means of Peltier blocks. As is well known, a Peltier block is a combination of a number of thermocouple elements wherein all of the cold junctions lie in one plane, namely the cold side of the Peltier block, and all of the warm junctions lie in an opposite plane, namely the warm side of the Peltier block.

It has been known to employ drying systems with drying means for controlling moisture or humidity in a climatic chamber. The employment of conventional drying means has not proven to be fully satisfactory. Due to the large, more or less adsorptive surfaces, the moisture or humidity regulation is very sluggish and inaccurate. Furthermore, for varying temperatures, the adsorption equilibrium or balance of the carbon dioxide with respect to the drying media varies and this causes an uncontrollable change in the gas being measured. Furthermore, feedback effects can arise because organisms present in the climatic chamber transpire. The transpiration is affected by the humidity, and a chamber humidity can develop in the climatic chamber which is completely independent of the local humidity or of the humidity which is to be simulated in the chamber.

It is accordingly an object of our invention to provide apparatus for regulating the humidity in a climatic chamber and method for operating the same by exactly duplicating the local humidities or the desired humidities of the gas admitted thereto independently of the transpiration of organisms that are located within the climatic chamber. It is a further object to provide such a regulating system which will operate with a minimum of time-lag.

With the foregoing and other objects in view we provide, in accordance with the invention, apparatus for regulating the moisture in a climatic chamber comprising a by-pass duct system connected to the climatic chamber and including a Peltier-cooled humidity separator and a pump. The by-pass duct system is of such construction that the gas throughput rate per minute is up to quadruple the volume of the climatic chamber. In accordance with a further feature of the invention, the pumping rate of the pump is variable.

With this apparatus of our invention the local humidity is exactly duplicated in the climatic chamber. The large gas volume circulated per minute through the by-pass system assures a constant humidity even when organisms located within the climatic chamber possess a high transpiration rate.

If a desired humidity independent of the local humidity is to be simulated in the climatic chamber, we provide in accordance with our invention an additional Peltier-cooled moisture or humidity separator in the gas supply line connected to the climatic chamber. This additional humidity separator is so constructed that the gas throughput rate per minute is up to 25% that of the volume of the climatic chamber. In accordance with the dew point of the gas present in this additional moisture separator, the humidity of the gas supplied to the climatic chamber is adjusted so that it corresponds to the humidity which is to be maintained in the climatic chamber. Consequently, the moisture or humidity produced by the transpiration of organisms in the climatic chamber is separated in the by-pass line.

In accordance with a further feature of our invention, a humidity or moisture sensing device replaceably extends into the gas of the climatic chamber and serves as the pilot sensor for the moisture or humidity separator in the gas supply line.

Further in accordance with our invention, the humidity sensing device is a LiCl measuring sensor. Each of the LiCl measuring sensors is the pilot sensor for a program-regulated control circuit.

A humidity separator is advantageously employed in accordance with our invention for cooling the gas to the required dew point and comprises a Peltier block which is thermally conductively and electrically insulatingly connected on the warm side thereof with aeratable cooling fins and on the cold side thereof with a heat exchanger in the form of a flow-through cooler. In the flow-through cooler there is provided a flow path which conducts the gas in counter flow at least twice across the cool surface of the Peltier block. Each of the flow paths includes a flow-through space, a liquid collecting vessel with a bleed valve or screw tap and a zig-zag shaped portion. The flow-through space connects with the gas supply line of the humidity separator and extends in the shape of a band over at least substantially the entire cooling surface of the Peltier block and terminates in the liquid collecting vessel. The liquid collecting vessel is located at the lowest location of the flow path. The zig-zag shaped portion extends from the liquid collecting vessel to the line through which the gas is discharged from the humidity separator. At the end of each flow path of the humidity separator, a moisture or humidity sensor is provided. In the flow-through cooler, a temperature sensor is located outside of the flow paths.

The moisture or humidity separator is provided with relatively long flow paths wherein the entire gas flowing therethrough is cooled to the desired dew point. Due to the relatively long flow path, the dew point can be adjusted accurately to a value that is plus or minus 0.25° C.

In accordance with yet additional features of our invention, only a portion of the limiting wall of the flow-through space or chamber located above the cool surface of the Peltier block is made of metal and the remaining portion of the limiting wall is formed of plastic material. Since dew points must also be attainable for the gas-drying operation which are below the zero point, the danger arises that the flow path will freeze. This danger is met first by the band-shaped construction of the flow-through chamber or space into which the gas initially enters and which practically acts as a cooling trap. If, furthermore, only a portion of the limiting wall of the flow-through chamber or space is constructed of metal, icing can only occur at this surface and the danger of freezing arises at most only after a very long operating period and after the entire cross section of the flow-through chamber or space has been covered over by the icing at the metal wall.

There is further danger that an undesired interaction of gas and metal will occur in the flow paths. This can be the case, for example, with chemically active constituents of the gas and would cause a change in the gas being measured. We therefore provide, in accordance with our invention, a coating of a pore-free plastic material having a thickness of 10 to 20 microns over all metal surfaces of the moisture or humidity separator which are contacted by the gas conducted therethrough. The pore-free plastic material can consist of fluorinated ethylene-propylene. This plastic material presents a chemically inert surface to the gas coming in contact therewith. Due to the relatively slight thickness of the layer of plastic material, i.e. of 10 to 20 microns, the gas cooling is not affected because the thermal resistance afforded by the layer is too small.

For exact humidity adjustment in the climatic chamber we provide, in accordance with our invention, method of operating the aforementioned apparatus of our invention by conducting the gas from the climatic chamber through the by-pass so that the dew point of the gas in the humidity separator in the by-pass is about 0.5 to 15° C. below the dew point of the gas in the climatic chamber. Due to this relatively small temperature difference between the dew points, a feedback effect is not produced because the gas returning to the climatic chamber has practically the same temperature as the gas in the climatic chamber. Due to the relatively large gas volume circulated in the by-pass line, an exact moisture or humidity regulation is possible in spite of the slight temperature difference between the dew points. The humidity regulation is thereby possible also for climatic chambers of relatively large volume such as for example chambers up to 50 cubic meter in volume. Furthermore, due to the relatively large circulating volume of the gas, the humidity regulation is practically inertia-less or free at any time lag.

In accordance with our invention, for simulating a desired humidity in the climatic chamber, we adjust the dew point in the humidity separator located in the gas supply line of the climatic chamber so that the humidity of the supplied gas corresponds to the humidity which is to be maintained in the climatic chamber. The humidity which arises from transpiration of organisms in the climatic chamber is then separated in the by-pass system. The transpiration rate of the organisms can thus be easily measured.

Other features which are considered as characteristic for the invention are set forth in the appended claims.

Although the invention is illustrated and described herein as apparatus for regulating the humidity in a climatic chamber and method of operating the same, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof will be best understood from the following description of a specific embodiment when read in connection with the accompanying drawings, in which:

FIG. 2 is a partly diagrammatic longitudinal sectional view taken along the line II—II in FIGS. 3 and 4 of a humidity separator forming part of our invention;

FIG. 3 is an elevational view of the zig-zag shaped portion 16 of the flow path at the right-hand side of FIG. 2; and FIG. 4 is an elevational view of the portion 20 of the flow-through cooler at the right-hand side of FIG. 2.

Figure 1:
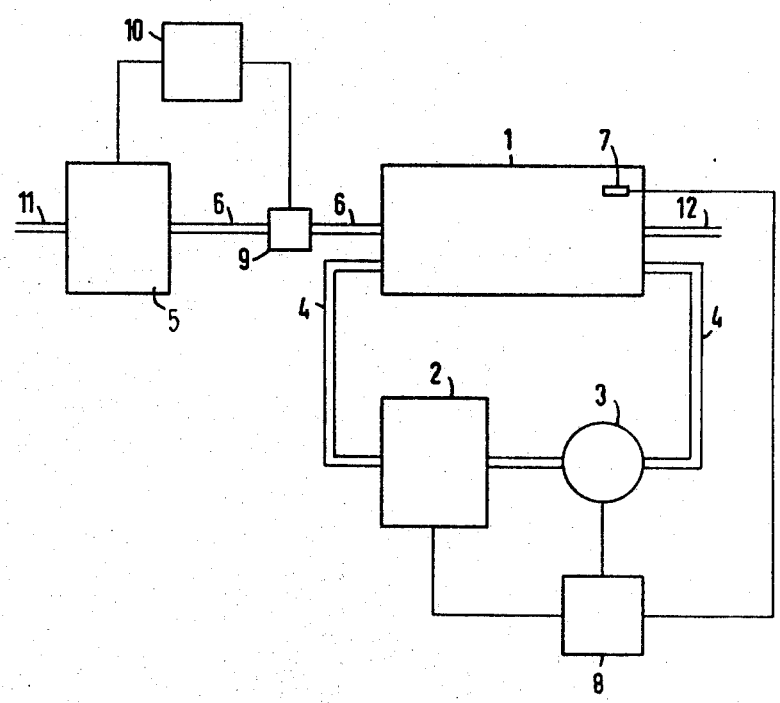
FIG. 1 is a diagrammatic view of a system combining a climatic chamber with the apparatus for regulating the humidity in the climatic chamber in accordance with our invention.

Referring now to the drawing and first particularly to FIG. 1 thereof, there is shown a climatic chamber 1 to which a by-pass line 4 is connected. A humidity separator 2 and a pump 3 are serially connected in the by-pass 4. The by-pass gas line 4, the humidity separator 2 and the pump 3 are so constructed that a gas quantity quadruple the volume of the climatic chamber can be circulated per minute through the by-pass system. The gas which is to be measured is supplied through a line 11 to a second humidity separator 5 and therefrom through a gas line 6 to the climatic chamber 1. The gas flows to the climatic chamber per minute through the line 6 at a rate of approximately up to a fourth of the volume of gas in the climatic chamber. A moisture or humidity sensor 7 extends into the gas of the climatic chamber and serves as pilot sensor for a regulating system 8 for controlling the dew point of the humidity separator 2 and/or the pumping rate of the pump 3 in the by-pass. The moisture sensor 7 can, for example, provide an electric signal of a strength proportional to the humidity contained in the climatic chamber 1 as compared to a given datum value of humidity. Furthermore, a humidity sensor 9 is provided in the gas supply line 6 which serves as pilot sensor for a regulating system 10 for controlling the humidity separator 5 in the gas supply line 11, 6. A temperature sensing device located in the humidity separator 5 can also serve as pilot sensor for the regulating system 10. More particularly, in the embodiment of the apparatus forming part of this invention there is employed a humidity sensor of the type known as LiCl measurement sensing devices. The regulating systems 8 and 10 can be program-controlled. The gas to be measured is conducted through a gas line 12 out of the climatic chamber 1 and passed through measuring devices such as for example ultra-red absorption devices.

If the local humidity is to be duplicated in the climatic chamber 1, it is sufficient for the humidity to be controlled only by the by-pass system 2, 3, 4. The dew point of the gas in the humidity regulator 2 is adjusted so that it is about 0.5 to 15° C. below the dew point corresponding to the value of the local humidity of the gas in the climatic chamber. The temperature difference depends upon the transpiration rate of organisms which are located in the climatic chamber. This small temperature difference between the dew points avoids the excitation of the organisms, due to gas which is too dry, to increase transpiration in a type of feedback that no longer corresponds to the transpiration rate for the local humidity.

If a humidity is to be simulated in the climatic chamber 1 that is independent of the local humidity, the gas must be supplied through the additional humidity separator 5 disposed in the gas line 11, 6. Thus, the dew point of the humidity separator 5 is adjusted so that the humidity of the supplied gas corresponds to the humidity which is to be provided in the climatic chamber 1. Also, in accordance with this method, the dew point of the humidity separator 2 in the by-pass line 4 lies only about 0.5 to 15° C. below the dew point of the gas in the climatic chamber 1, and the moisture or humidity produced by the transpiration is circulated in the humidity separator 2. Since only up to a quarter of the gas volume of the climatic chamber is supplied per minute from the gas supply line 11, 6 to the climatic chamber 1, the transpiration rate of organisms located in the climatic chamber remains also in this case independent of the humidity control. It must be emphasized that due to the relatively large gas volume circulating in the by-pass line 4, the humidity regulation is virtually inertia-less or without any appreciable time lag, and the regulating systems 8 and 10 can be controlled with programs including a rapid change of the humidity value in the climatic chamber 1.

FIG. 2 is a longitudinal sectional view taken along the lines II—II in FIGS. 3 and 4 of the humidity separator constructed in accordance with our invention, which is employed both in the by-pass system 2, 3, 4 and in the gas supply system 11, 5, 6. In FIG. 2, the sectioned portion is that of the flow-through cooler. Also shown in FIG. 2 is a Peltier block composed of p- and n-conductive thermoelectrically operative semiconductor members 14 which are electrically conductively connected by contact bridges 13. On the cold side of the Peltier block, to the right-hand side thereof as shown in FIG. 2, there is applied a metal plate 15 which serves as support and heat conductor for the flow-through cooler. A flow path is provided in the flow-through cooler including a flow-through space or chamber 18, a liquid-collecting vessel 19 and a zig-zag shaped portion 17 (shown more clearly in FIG. 3). The flow-through space 18 is connected to to a nipple 21 which in turn is connected to the by-pass line 4 through which the gas enters the humidity separator 2. The space 18 is in the shape of a relatively narrow band extending over the entire cool surface of the Peltier block. The flow-through space 18 terminates in the liquid-collecting vessel 19 disposed at the lowest location of the flow path as shown in FIG. 3. The liquid-collecting vessel 19 is provided with a bleed valve or tap screw 22. From the liquid-collecting vessel 19, the gas is conducted through the zig-zag shaped portion 17 of the flow-path (as shown in FIG. 3) to a nipple 27 which connects with the discharge portion of the by-pass line 4. The zig-zag shaped portion 17 is milled, for example, in a metal block 16 and abuts the plate 15 located adjacent the cool side of the Peltier block. The metal block 16 simultaneously forms a portion of the limiting or defining wall of the flow-through chamber 18. The remaining portion 20 of the limiting wall of the flow-through chamber or space 18 is constructed of a plastic material. The plastic member 20 abuts the metal plate 16, and the gas space or chamber 18 is suitably sealed by conventional sealing means 23. Cooling fins 24 are disposed on the warm side of the Peltier block and are cooled by means of a fan 25 shown diagrammatically in FIG. 2. The heat energy which is extracted by the flow-through cooler is dissipated by means of the cooling fins 24.

In FIG. 3, there is shown an elevational view of the zig-zag shaped portion 17 of the flow path which leads from the liquid-collecting vessel 19 to the gas discharge nipple 27. Near the end of this portion 17 of the flow path, a humidity sensor 26 is provided. In addition, a temperature sensor is provided in a suitable recess 28 formed in the metal block 16.

FIG. 4 is an elevational view of the portion 20 of the flow-through cooler which is made of plastic material and in which the flow-through space or chamber 18 is milled. The flow-through space 18 is of band-shaped construction, i.e. one of its dimensions is much smaller than the other two dimensions thereof, and extends as shown in FIG. 4 almost over the entire cooling surface of the Peltier block.

The liquid separator combines various advantageous features. The gas is conducted in a relatively long flow-path at least twice over the entire cooling surface of the Peltier block. A result thereof is that a very accurate adjustment of the dew point of the gas and therewith a very accurate adjustment of the humidity value, deviating only about ±2% from the nominal value, are obtained. Furthermore, the relatively long flow path affords regulation of the humidity value which is as free as possible from delay or time-lag. Moreover, due to the construction of the flow path, the flow path is prevented from freezing at dew points below 0° C. The flow-through space or chamber 18 into which the gas is supplied, operates as a cooling trap in which the gas is cooled virtually to the desired dew point beforehand. The major portion of the moisture or humidity is therefore separated in this space. This space is so formed that the gas is cooled only over the metal surface of the block 16. Cooling from the plastic body 20 cannot take place because of the high thermal resistance. The liquid will therefore deposit on the metal wall of the block 16 and from there will either flow down into the liquid-collecting vessel 19 or, at dew points below 0° C., will ice this metal wall. The growth or development of the ice layer can therefore only take place starting from the metal wall, and a very long time will elapse before any freezing of the flow-through space 18 will occur. The liquid separator constructed in accordance with this principle is therefore suitable also for operation below 0° C. for a long period of time. The exact adjustment of the dew point of the traversing gas occurs in the zig-zag shaped portion 17 of the flow path. In that zig-zag portion 17, however, very little liquid is separated so that danger of freezing of the portion 17 of the flow path is practically nonexistent.

A further improvement of this liquid separator is obtained if the metal surfaces of the flow-path contacted by the traversing gas are covered with a pore-free or non-porous plastic material with a thickness of 10 to 20$\mu$. The gas flowing through the humidity separator then encounters only chemically inert surfaces and a chemical exchange between the metal and the gas, which would ordinarily alter the gas composition, is thereby rendered impossible. Fluorinated ethylene-propylene is employed as the nonporous plastic material for coating the metal surfaces of the flow path. For relatively thin coatings of 10 to 20$\mu$ of the plastic material, there is little fear that there would be any reduction in the cooling characteristics, since the heat resistance of these coatings or layers is too small.

A further advantage of the apparatus for humidity control according to our invention should be emphasized. In the humidity separator 2 of the by-pass system 4, only that humidity or moisture is separated which is produced by the transpiration of organisms located in the climatic chamber 1. The rate of transpiration of these organisms can be determined directly from the separated quantity of liquid in the humidity separator 2, for example by means of weighing. Consequently, a considerable simplification of the method of measuring the rate of transpiration is obtained, which would otherwise be obtainable with the same degree of accuracy only in an ultra-red absorption device connected into the gas discharge line 12.

We claim:
1. Apparatus for regulating the humidity in a climatic chamber containing transpiring organisms, wherein the temperature is variable with Peltier blocks comprising a gas supply line connected to the climatic chamber for supplying gas atmosphere thereto, a first Peltier-cooled humidity separator being connected in said supply line, and a gas by-pass duct system connected to the climatic chamber so as to by-pass said supply line and including a second Peltier-cooled humidity separator and a pump serially connected in said by-pass duct system.

2. Apparatus according to claim 1, wherein said by-pass duct system is of such construction that the through-put rate of gas therethrough per minute is up to four times the volume of the climatic chamber.

3. Apparatus according to claim 1, wherein said pump has a variable pumping rate.

4. Apparatus according to claim 1, wherein said first humidity separator is so constructed that the through-put rate of gas supplied therethrough per minute is up to 25% the volume of the climatic chamber.

5. Apparatus according to claim 1, further comprising a moisture sensing device replaceably extending into the gas in the climatic chamber, and a regulating system for said by-pass duct system connected thereto and to said humidity separator, said moisture sensing device serving as pilot sensor for said regulating system, whereby the dew point of the gas in said humidity separator or the pumping rate of said pump or both are regulatable.

6. Apparatus according to claim 1, including supply line connected to the climatic chamber, and additional Peltier-cooled humidity separator disposed in said gas supply line, a moisture sensing device replaceably disposed in said gas supply line between the climatic chamber and said first humidity separator, and a regulating system for said first humidity separator connected to said moisture sensing device and to said first humidity separator, said moisture sensing device serving as pilot sensor for said regulating system.

7. Apparatus according to claim 1, further comprising a moisture sensing device replaceably extending into the gas in the climatic chamber, and a regulating system for said by-pass duct system connected thereto and to said second humidity separator, said moisture sensing device serving as pilot sensor for said regulating system, whereby the dew point of the gas in said second humidity separator or the pumping rate of said pump or both are regulatable, another moisture sensing device replaceably disposed in said gas supply line between the climatic chamber and said first humidity separator, and another regulating system for said first humidity separator connected to said other moisture sensing device and to said first humidity separator, said other moisture sensing device serving as pilot sensor for said other regulating system.

8. Apparatus according to claim 7, wherein said moisture sensing devices are LiCl measurement sensors.

9. Apparatus according to claim 8, wherein said regulating systems are program-controlled and each of said LiCl measurement sensors is pilot sensor for the respective regulating system.

10. Peltier-cooled humidity separator of an apparatus according to claim 1, comprising aeratable cooling fin means, and a heat exchanger in the form of a flow-through cooler, said cooling fin means and said heat exchanger being respectively connected thermally conductively and electrically insulatingly to the warm and cold sides of the Peltier block cooling the separator.

11. Humidity separator according to claim 10, wherein said flow-through cooler has a flow path for conducting the gas in counterflow at least twice across the cold surface of said Peltier block, said flow path including a flow-through space, a liquid-collecting vessel having a bleed valve, and a zig-zag shaped portion, said flow-through space being connected with an upstream portion of the by-pass line from the climatic chamber and extending in the shape of a band over at least substantially the entire cooling surface of said Peltier block and terminating in said liquid-collecting vessel, said liquid-collecting vessel being disposed at the lowest location of said flow path, said zig-zag shaped portion of said flow path extending from said liquid-collecting vessel to a downstream portion of the by-pass line returning the gas to the climatic chamber.

12. Humidity separator according to claim 11, including a moisture sensing device located substantially at the end of each flow path.

13. Humidity separator according to claim 11, wherein said flow-through cooler is formed with a recess outside of said flow path for receiving a temperature sensing device therein.

14. Humidity separator according to claim 11, wherein said flow-through space is defined by a wall, a portion of said wall extending over the cooling surface of said Peltier block being the only part of said wall made of metal, the remainder of said wall being formed of plastic material.

15. Humidity separator according to claim 14, including a coating of non-porous plastic material having a thickness of 10 to 20μ being disposed on all the metal surfaces of said humidity separator contacted by the gas passing therethrough.

16. Humidity separator according to claim 15, wherein said non-porous plastic material is fluorinated ethylene-propylene.

References Cited

UNITED STATES PATENTS

| | | | |
|---|---|---|---|
| 3,073,127 | 1/1963 | Schmerzler | 62—3 |
| 3,165,900 | 1/1965 | Huntington | 62—3 |

WILLIAM J. WYE, Primary Examiner